March 4, 1930.  F. A. PARSONS  1,749,225
MILLING MACHINE ORGANIZATION
Filed Aug. 21, 1924  10 Sheets-Sheet 1
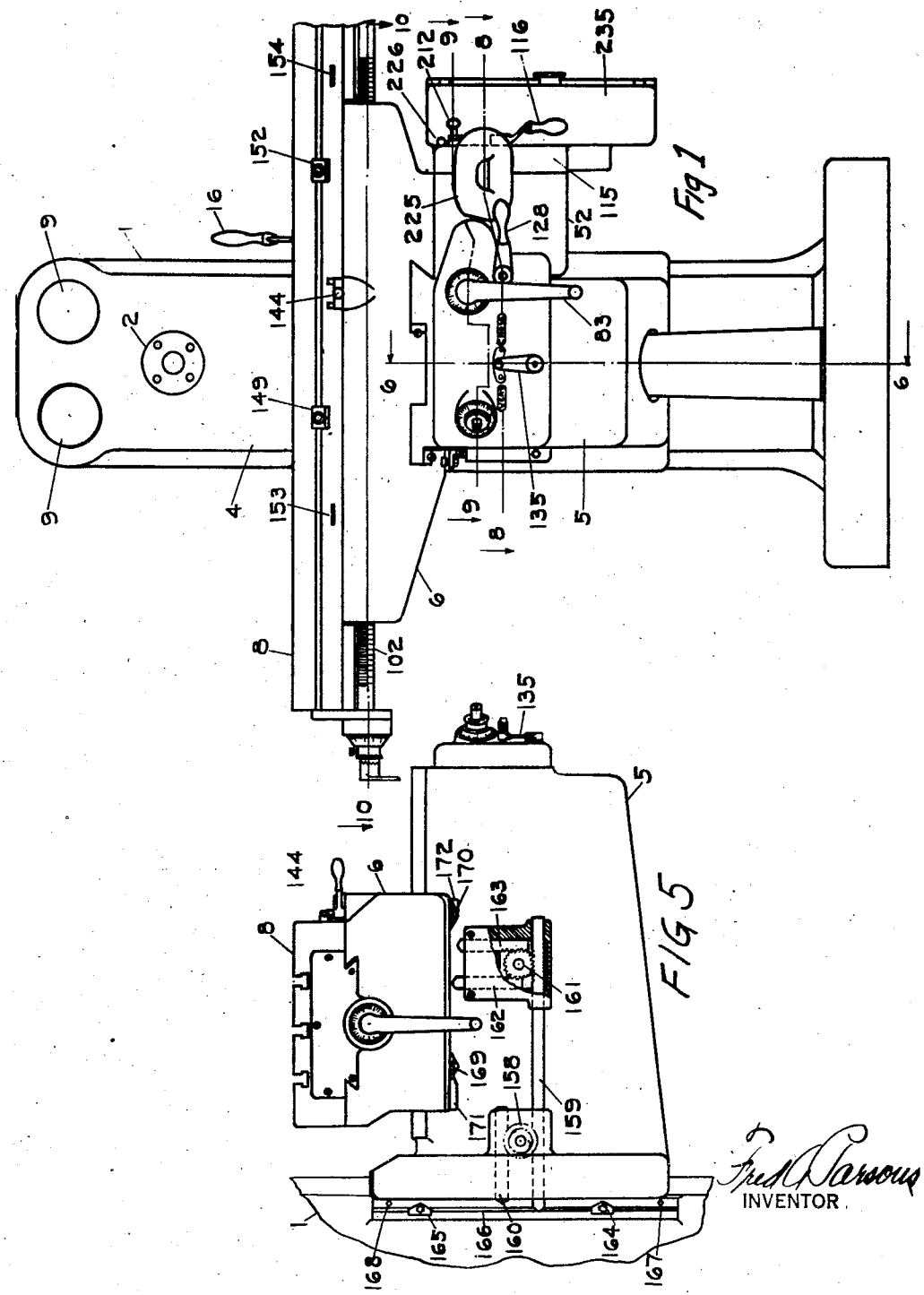

March 4, 1930.   F. A. PARSONS   1,749,225
MILLING MACHINE ORGANIZATION
Filed Aug. 21, 1924   10 Sheets-Sheet 2
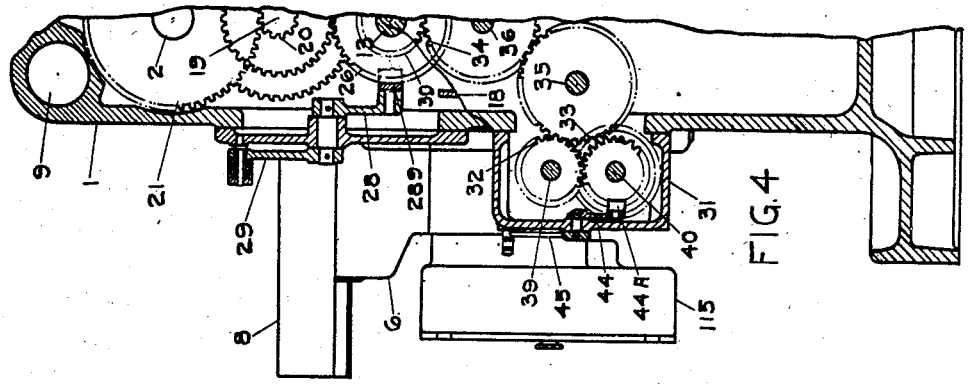
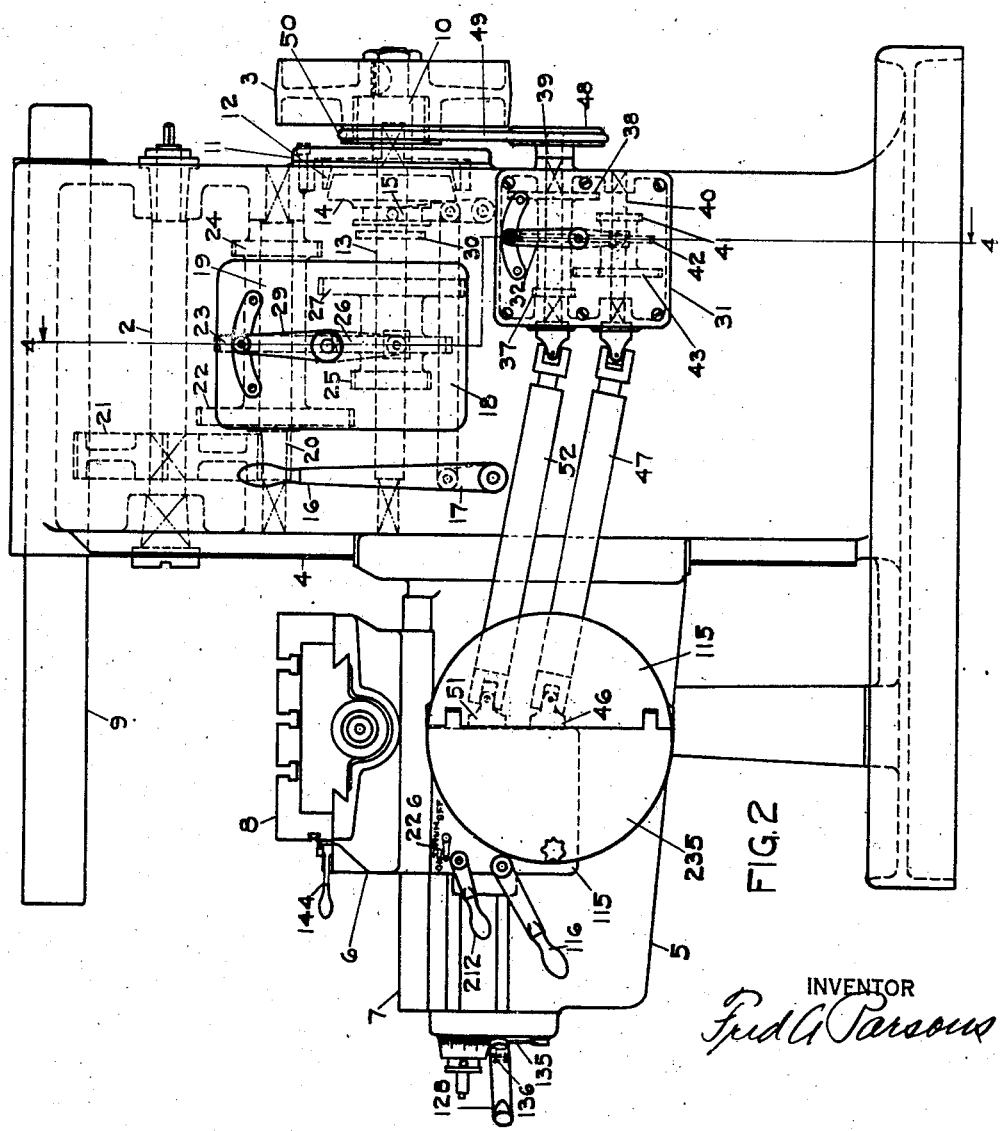

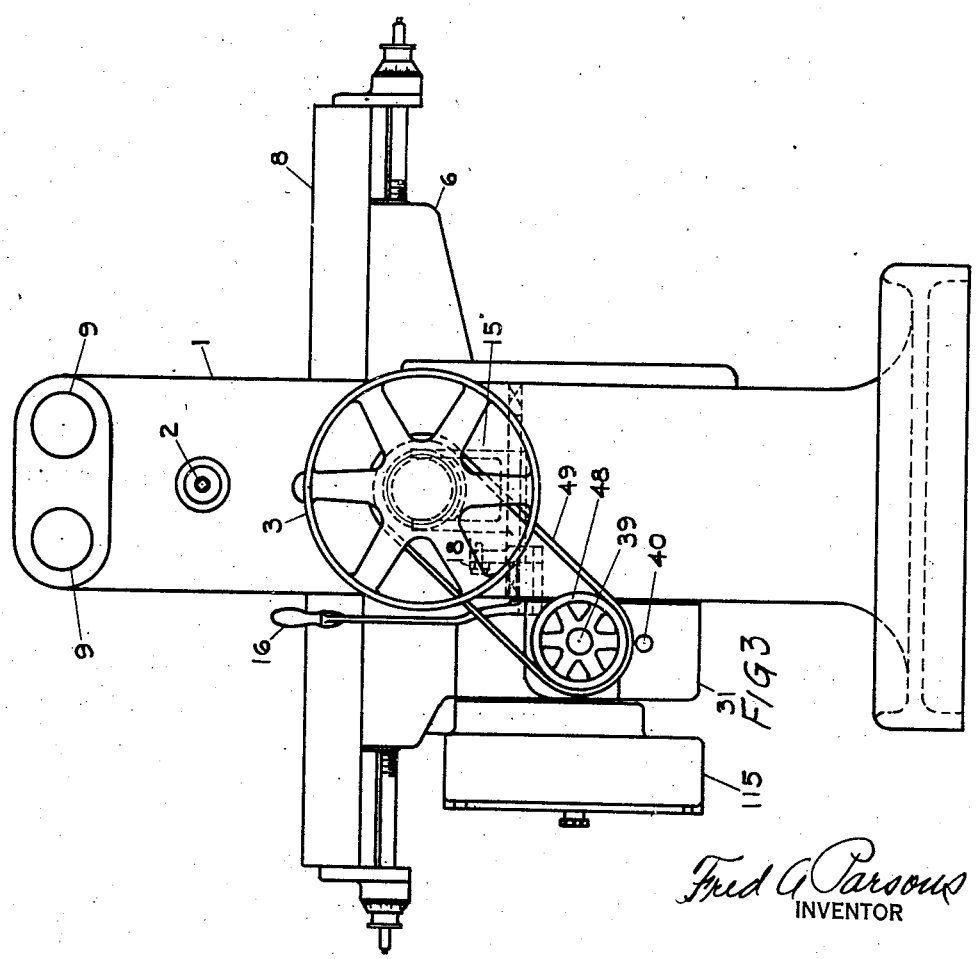

March 4, 1930.  F. A. PARSONS  1,749,225
MILLING MACHINE ORGANIZATION
Filed Aug. 21, 1924  10 Sheets-Sheet 4

Fred A. Parsons
INVENTOR

March 4, 1930.    F. A. PARSONS    1,749,225
MILLING MACHINE ORGANIZATION
Filed Aug. 21, 1924    10 Sheets-Sheet 7
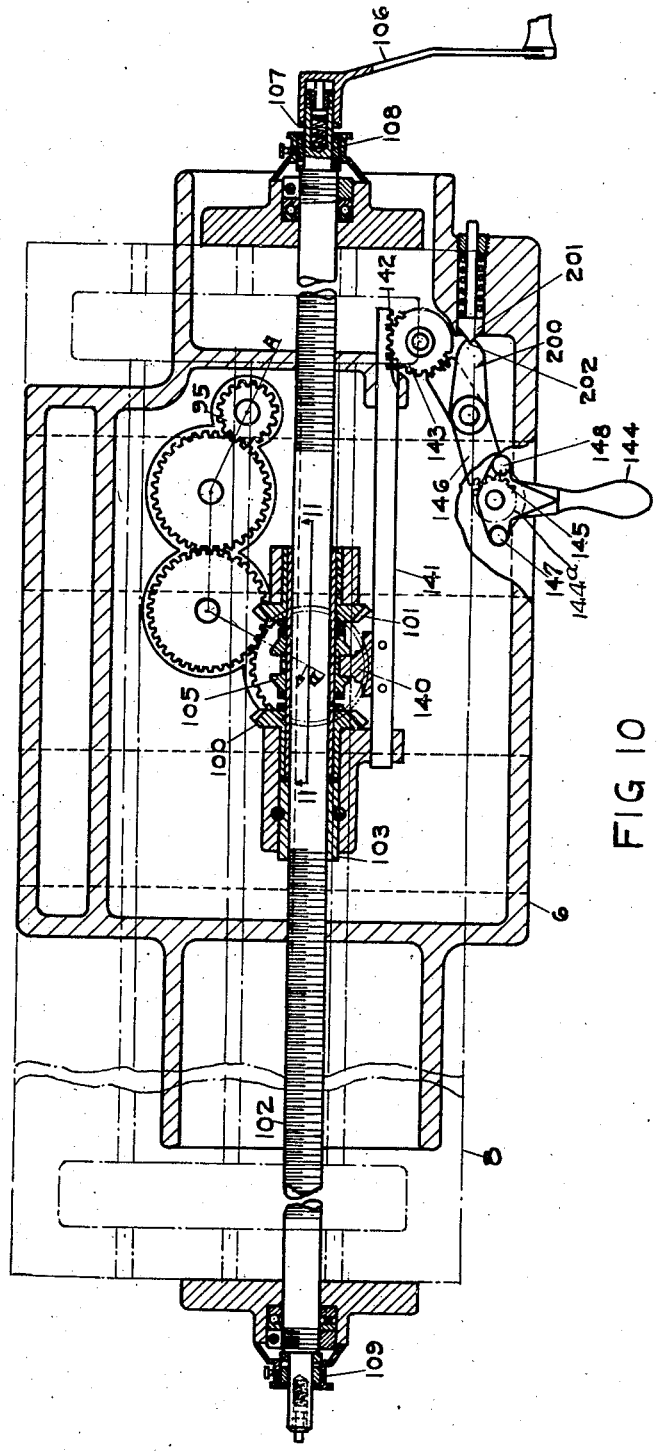
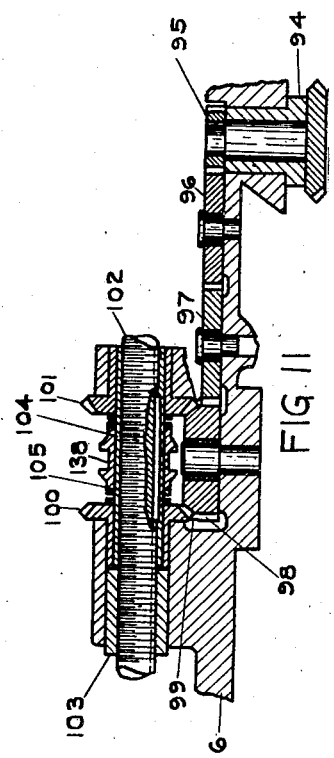
Fred G. Parsons
INVENTOR March 4, 1930.  F. A. PARSONS  1,749,225
MILLING MACHINE ORGANIZATION
Filed Aug. 21, 1924   10 Sheets-Sheet 8
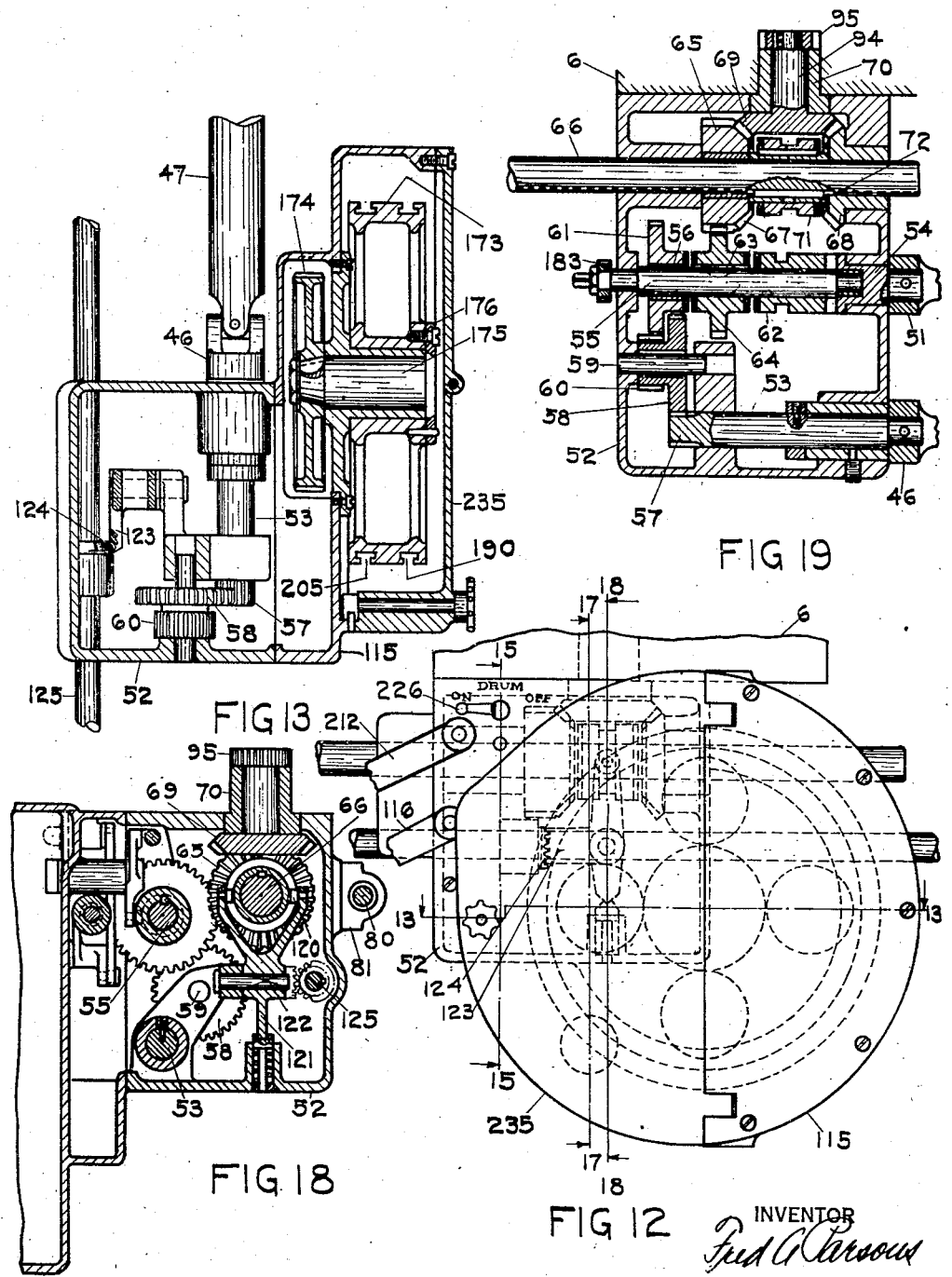

March 4, 1930.  F. A. PARSONS  1,749,225
MILLING MACHINE ORGANIZATION
Filed Aug. 21, 1924   10 Sheets-Sheet 9
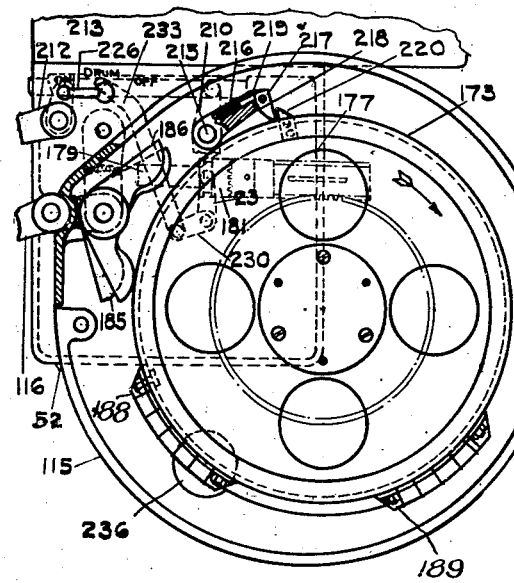
FIG. 14
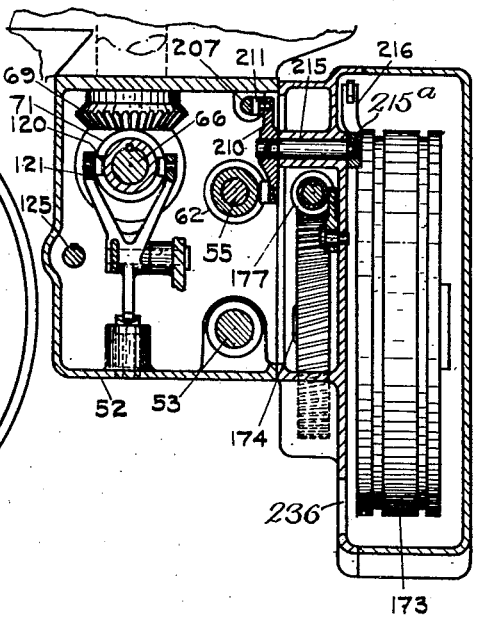
FIG. 17
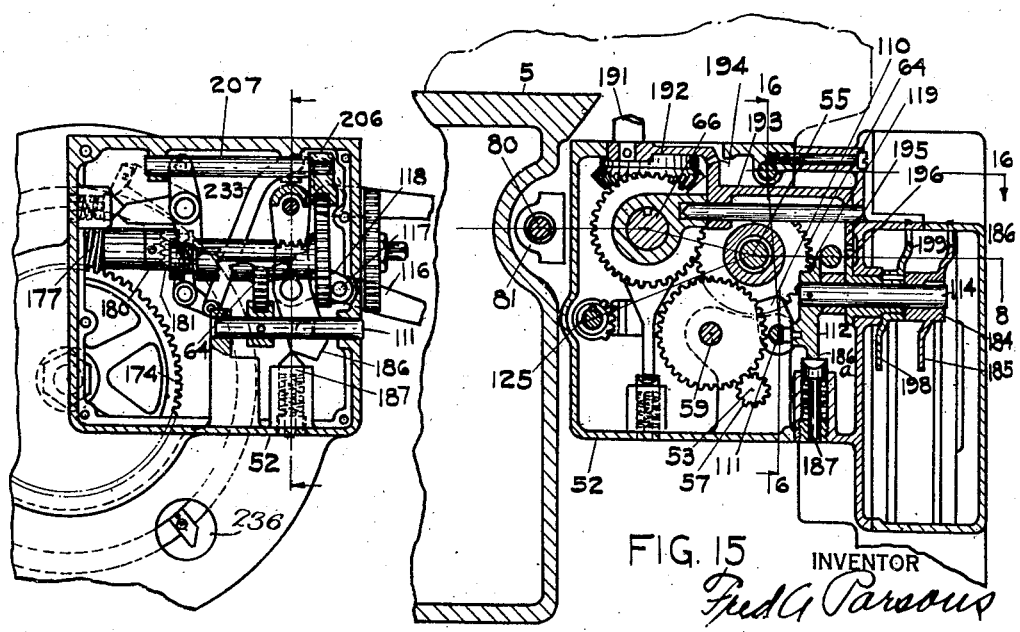
FIG. 16
FIG. 15
INVENTOR
Fred G Parsons

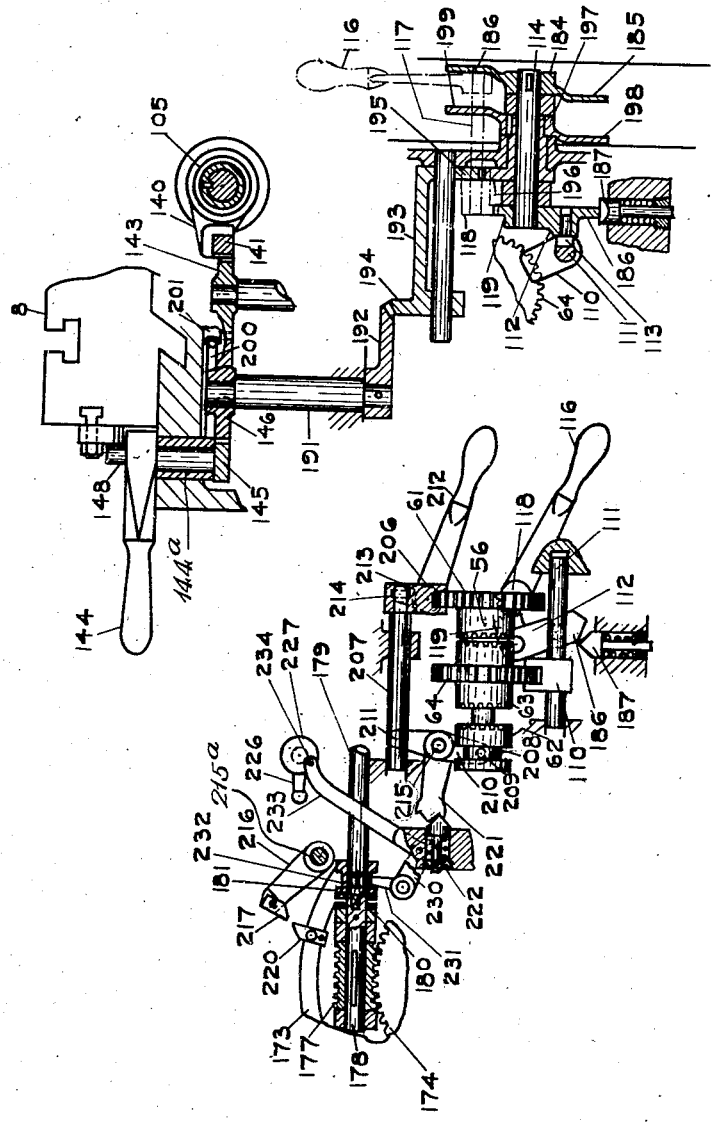

Patented Mar. 4, 1930

1,749,225

UNITED STATES PATENT OFFICE

FRED A. PARSONS, OF MILWAUKEE, WISCONSIN, ASSIGNOR TO KEARNEY & TRECKER CORPORATION, OF WEST ALLIS, WISCONSIN, A CORPORATION OF WISCONSIN

MILLING-MACHINE ORGANIZATION

Application filed August 21, 1924. Serial No. 733,341.

This invention relates to improvements in a milling machine organization, and more particularly to the controlling of the power movements of a milling machine.

The main purpose of this invention is to produce a milling machine provided with both hand and automatic control or trip means, and with simplification and improvement whereby both hand and power movements, having for the power movements both hand and automatic control, are accomplished in an improved and more convenient manner than heretofore and with a simple construction.

An important object is to provide in a milling machine a combination of controls, including complete hand control of the operative movements, automatic disengagement of all of the power movements by the means of dogs mounted on or connected to move in unison with the machine unit or support and other control means whereby the movement of the support may be controlled automatically by means other than those above-mentioned and operative when the support is inoperative or stationary.

Another important object is to provide means for preventing manual shifting of controls under certain conditions which would interfere with the timing of the automatic control devices and might thereby cause damage to the machine, work, or tools.

Another object relates to the controlling of power movements automatically whereby a movable support may be caused to execute a cycle of movement including a return to the starting point, and may then be caused either to stop or to repeat its cycle, as pre-determined by the setting of the control devices.

Another object relates to the automatic control of the change of rate or direction of movement of a support at intermediate points of the cycle of movement just mentioned.

Another object is to provide means whereby during a cycle of movement the support may be stopped at intermediate points in the cycle, and may then automatically be caused to proceed to complete its cycle.

A very important object is the suitable combination of an automatic controller of a drum or revolving type, with a milling machine structure and organization in such a manner that as much as possible of the structure and control means ordinarily employed in machines of this type and which are therefore familiar to present workmen and operators may be retained and operatively combined to produce new results and advantages not possible by either control method alone.

Another object relates to the control during a given support movement by means of dogs or control elements fixed with the support or movable in unison therewith for certain of the controlled functions, and by means of dogs fixed with or movable in unison with an independently movable drum or similar control member for other functions, or for the same function as the support dogs but at a different point of the controlled movement.

Another object relates to the simplification and improvement of milling machine transmission and control mechanism and to the improved combination of such mechanism into the structure of a machine of a certain type.

With these and other objects in view, my invention resides and consists in the construction and novel combination and arrangement of parts hereafter more fully described and illustrated in the accompanying drawings and pointed out in the claims hereto appended, although it will be apparent that my invention as herein illustrated is susceptible to a variety of modifications without departing from the spirit or scope thereof, or without sacrificing any of the advantages of the invention herein claimed.

The machine shown in the accompanying drawings is of the type commonly known as a knee and column type horizontal milling machine. In the accompanying drawings similar characters of reference denote like and corresponding parts throughout the several figures forming the drawings, in which:

Figure 1 shows a front elevation of a knee and column type milling machine to which my invention has been applied.

Figure 2 is a side elevation taken from the right of Figure 1.

Figure 3 is a rear elevation.

Figure 4 is a partial vertical section along the line 4—4 of Figure 2.

Figure 5 is a partial side elevation from the left of Figure 1, showing the vertically movable elements of this type of machine, commonly known as the knee, table, and saddle, a small portion of the column upon which the knee slides likewise being shown.

Figure 10 is a horizontal section through the table driving mechanism along line 10—10 of Figure 1.

Figure 11 is a sectional development, being in part a vertical section along line 11—11, Figure 10, and in part a vertical section along line a—a, Figure 10.

Figure 12 is an enlarged side view of a portion of the mechanism shown in Figure 2, representing the housing for certain of the driving mechanism supported from the saddle.

Figure 13 is a horizontal section along the line 13—13 of the Figure 12.

Figure 14 is a vertical section along the line 14—14 of Figure 8.

Figure 15 is a vertical section along the line 15—15 of Figure 12.

Figure 16 is a vertical section along line 16—16 of Figure 15.

Figure 17 is a vertical section along line 17—17 of Figure 12.

Figure 18 is a vertical section along line 18—18 of Figure 12.

Figure 19 is a development showing a part of the gearing and transmission elements contained in a box or housing carried by the saddle.

Figures 20 and 21 represent diagrammatical developments of certain of the control elements, more particularly showing part of the trip devices and their motion transmitting relationship.

Figure 6:
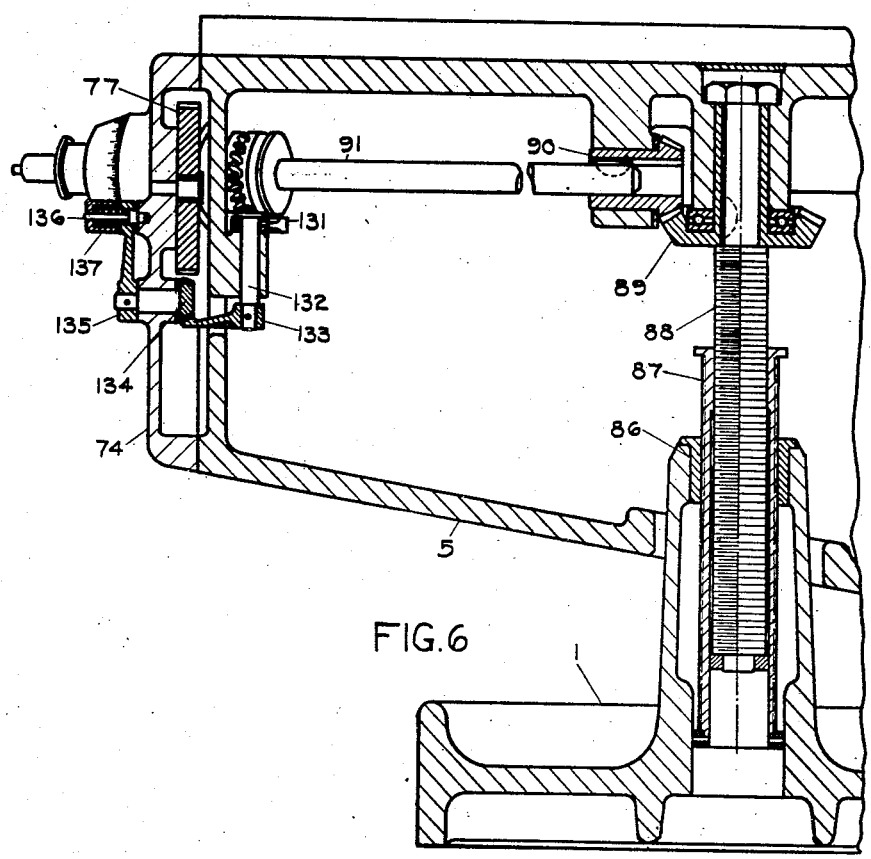
Figure 6 is a vertical section through a portion of the knee and column along line 6—6 of Figure 1.

The column 1 provides a support for a spindle or cutter support 2 rotatable in bearings fixed therein and likewise provides a support for a drive pulley 3 having suitable bearings for rotation and forming a driving or power source for the various transmission trains. Suitable ways 4 are provided on the column 1 for the vertical adjustment of a work-supporting and adjusting unit consisting of a knee or support 5 directly slidable vertically on the ways 4 of the column 1, a saddle or support 6 slidable in and out toward the column on ways 7 provided on the knee 5, and a table or support 8 slidable transversely to the movement of the saddle and the knee in suitable ways provided in the saddle 6. The column likewise supports a pair of overarms 9—9.

From the foregoing it will be seen that the machine structure corresponds to the type of machine ordinarily known as the knee and column type milling machine in which a rotatable spindle provides means for supporting and driving the cutter, and the work supported from the table is movable relative thereto in three transverse directions or courses.

I will now describe the means whereby power applied to the pulley 3 may be utilized to drive the spindle 2 at varying rates or may be disconnected from said spindle. The pulley 3 is fixed with and supported on the outer end of a rotatable shaft 10 having a bearing in an extension of a plate 11 bolted to the rear of the column 1. Fixed to the other end of the shaft 10 is a clutch element or member 12 which is thus continuously rotated when the pulley is driven. A shaft 13 is axially aligned with shaft 10 and has a bearing at the one end in the column 1 and at the other end in a suitable bore in the shaft 10. Slidable on the shaft 13 but keyed to rotate therewith, is a complementary clutch element 14 adapted to be engaged or disengaged with the clutch element 12 by means of a pivoted forked lever 15 which engages a spool or groove in the clutch member 14 and may be moved by the movement of a pivoted handlever 16 through the action of a lever 17 and rod 18 connected to the forked lever 15.

Journaled in the column is a shaft 19 having at the one end a pinion 20 permanently meshed with a gear 21 fixed on the spindle 2. Likewise fixed with the shaft 19 are a series of gears 22, 23, 24 of varying diameters arranged to be engaged one at a time at the will of the operator by the gears 25, 26, and 27, respectively, which are slidably keyed on the shaft 13, and may be shifted for engagement by the means of a pivoted hand-lever 29 and a lever 28 movable therewith which carries a fork 289 engaging the gear 26.

It will thus be seen that the shaft 13 may drive the spindle at a variety of speeds, according to the engagement of the gearing, the particular speed being determined by the operator; or, if the clutch members 12 and 14 be disengaged by the operator, the spindle may remain stationary although the pulley is running.

I will now describe how the power is led from the pulley 3 forward into the movable unit consisting of the knee 5, saddle 6, and table 8. Fixed with the shaft 13 is a gear 30, and journaled in a hollow box or casing 31 which is bolted to the main column 1, is a feed gear 32. Intermediate between gears 30 and 32 are idler gears 33 and 34 respectively supported upon shafts 35 and 36 which are journaled in the column. Fixed to rotate with the gear 32 are a plurality of other gears 37 and 38, the several gears 32, 37, and 38 being supported by, but being free to rotate independently of, a shaft 39 journaled in and passing through the box 31. A shaft 40 journaled in the box 31 has keyed thereto slidable gears 41, 42, and 43 respectively adapted to mesh one at a time with the gears 38, 32, and 37, with which they may be slidably engaged at the will of the operator through the medium of a pivoted lever 44 connected with a hand-lever 45 and which carries a fork 44ª engaging with gear 42. The shaft 40 is connected for rotation with a rotatable member 46 bodily movable with the saddle 6, the connecting elements between the shaft 40 and the member 46 consisting of the several parts of a telescopic universal joint shaft 47. The transmission train described constitutes a feed train or transmission including a feed rate changer consisting of the gears 41, 42, 43, and the gears mating therewith, and operative whenever the cutter spindle 2 is operative but not otherwise.

Fixed on the shaft 39 is a pulley element 48 adapted to be continuously driven whenever the pulley 3 is driven by the means of a flexible drive member or belt 49 engaging with the rim of the pulley 48 and likewise engaging with the periphery of a hub 50 of the pulley 3. Power thus applied to the shaft 39 is transmitted to a rotatable member 51 bodily movable with the saddle 6, the connection between the shaft 39 and the member 51 being made by the means of a telescopic universal joint shaft 52 and its various component parts. The transmission train described constitutes a quick or rapid traverse train or transmission whereby the member 51 will be driven at a constant rate whenever the pulley 3 is actuated.

I will now describe the means whereby power transmitted to the elements 46 and 51 may be caused to actuate the knee 5, the saddle 6, or the table 8, upon their respective slides and in either direction of their reciprocatory movement or whereby these members may be manually actuated.

Fixed with the saddle 6 is a gear case or housing 52, see Fig. 19, which provides bearings for a rotatable shaft 53 upon which the element 46 is fixed, and a rotatable short shaft 54 upon which the element 51 is fixed. A shaft 55 is axially aligned with the shaft 54 and has a bearing at the one end in the case 52 and at the other end in the shaft 54 as more particularly shown in Figure 19. A clutch element 56 is slidably mounted on the shaft 55 and power from the element 46 is applied to the clutch element 56 through the medium of a pinion 57 on shaft 53, a reduction gear 58 rotatably mounted upon a stud 59, a pinion 60 fixed with the gear 58, and a gear 61 fixed on the hub of the clutch element 56 and with which the pinion 60 meshes. Slidably mounted upon the shaft 55 is a second clutch element 62. Power is applied to the clutch element 62 from the member 51 by means of a clutched engagement of the element 62 with the enlarged end of the shaft 54, as more particularly shown in Figure 19. Slidably keyed to the shaft 55 is a selector or clutch member 63 having clutch teeth upon its end faces adapted to mesh with complementary clutch teeth on the faces of the clutch elements 56 and 62, accordingly as it is shifted the one way or the other. It will thus be seen that either a feed or power rapid traverse rate will be selectively applied to the member 63 and likewise to the shaft 55 accordingly as the member 63 is shifted into clutch engagement with the clutch element 56 or the clutch element 62 by means which will be later described.

On the periphery of the clutch member 63 is a driving gear 64 which meshes with and drives a gear 65 rotatably mounted on and supported by a shaft 66.

Up to this point the transmission described has been common to the actuation of the knee, table and saddle, but here the transmissions branch into a separate or individual drive for the table and a combination drive for knee and saddle, which latter I will now proceed to describe.

Figure 9:
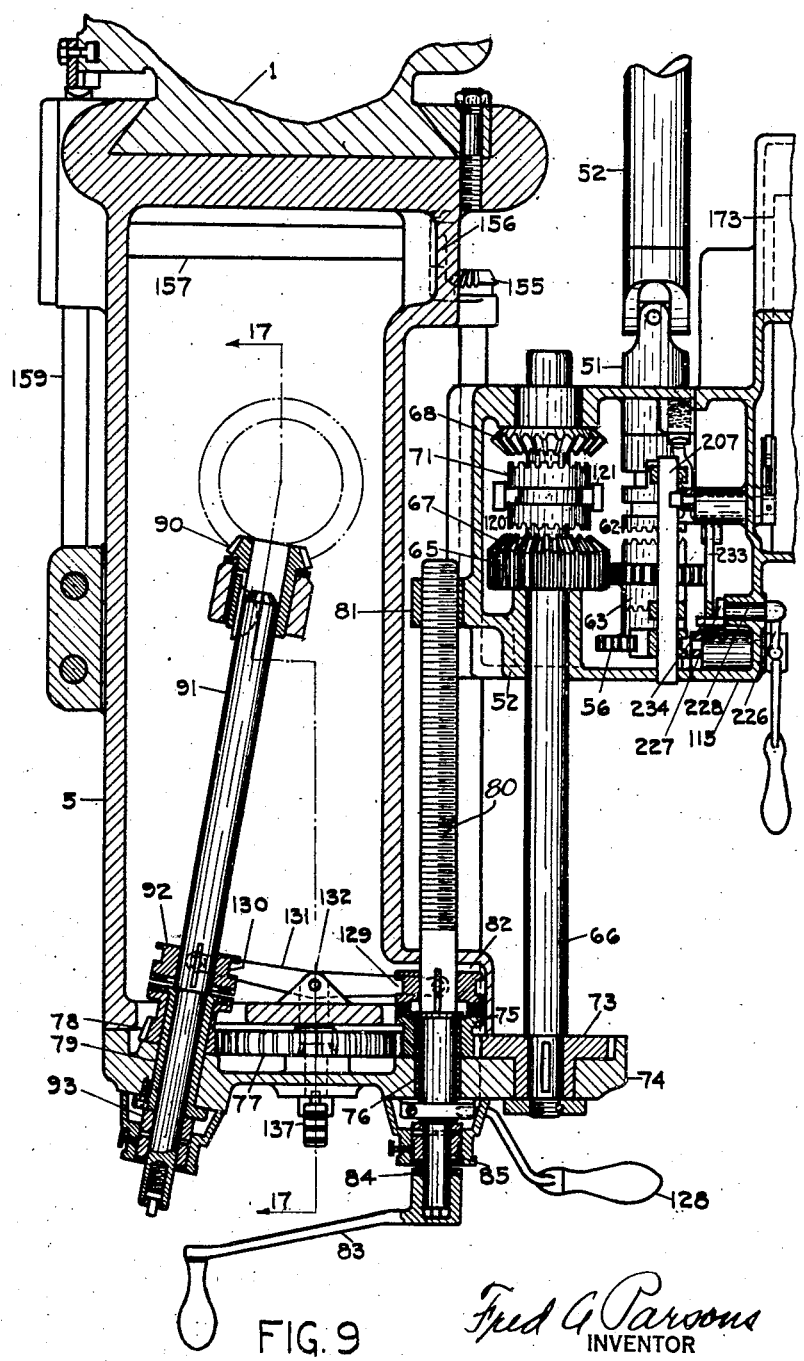
Figure 9 is a similar horizontal section along line 9—9 of Figure 1.

Fixed with the gear 65 is a bevel gear 67 having a clutch face. A second bevel gear 68 likewise having a clutch face is suitably disposed with a bearing in the case 52, and intermeshing with the bevel gears 67 and 68 is an intermediate bevel gear 69 provided with a bearing in a bushing 70 fixed in the saddle 6. When the gear 65 revolves, the bevel gears 67 and 68 will thus revolve in opposite directions. Intermediate between the clutch faces of the bevel gears 67 and 68 is a clutch or reverser member 71 slidably keyed to a sleeve 72 which in turn is slidably keyed with the shaft 66. When the member 71 is shifted in the one or the other direction, it will partake of the motion of the bevel gear 67 in the one direction, or of the bevel gear 68 in the opposite direction and will transmit such motion to the shaft 66 the parts thus acting as a reverser for the shaft 66 and the trains driven therefrom. The shaft 66 is fixed at its front end with a gear 73 as more particularly shown in Figure 9, the gear 73 being provided with a bearing in a plate 74 attached to the front end of the knee 5. The gear 73 is in driving relation to a train consisting of a gear 75 having a bearing on a sleeve 76, an intermediate gear 77 having a bearing on a stud fixed in plate 74, and an angular gear 78 having a bearing on a sleeve 79 whereby when the shaft 66 is driven in the one direction or the other, according to the position of the clutch or reverser member 71, the entire train of gearing 73, 75, 77, and 78 will be driven by the shaft in a direction determined by the position of the member.

A cross feed screw 80 is rotatably fixed against axial movement in the plate 74 and is provided with a nut 81 fixed on the case 52 and therefore fixed for cross movement with the saddle 6. The gear 75 is provided with a clutch face with which a clutch element 82 is slidably keyed to the cross screw 80 may be engaged, in which case the screw 80 will be driven at a feed or power rapid traverse rate as determined by the engagement of the clutch member 62 and in a direction determined by the engagement of the clutch or reverser member 71, thus moving the saddle 6 in or out at a feed or power rapid traverse rate according to the position of the various clutch members. If the clutch element 82 be disengaged, the saddle may be moved in and out manually by the means of a hand crank 83 having a clutch face 84 adapted to engage a clutch face on a member 85 fixed on the end of the screw 80.

A nut 86 Fig. 6 is fixed in an upward projection of the base of the column 1 and is engaged by the outer element 87 of a telescopic screw. The inner element 88 of the telescopic screw is provided at the upper end with a bevel gear 89 fixed with the screw and having a bearing in the knee 5. Meshing with the bevel gear 89 is a bevel pinion 90. A shaft 91 is keyed with the bevel pinion 90 and at its outer end passes through the sleeve 79. The angular gear 78 is provided at the one end of its hub with clutch teeth and slidably keyed with the shaft 91 is a clutch element 92 having upon its end clutch teeth adapted to engage or disengage with the clutch teeth on the hub of the gear 78. Should the clutch element 92 be engaged with the clutch teeth on the gear 78, the screw elements 87 and 88 will be rotated either at a feed or power rapid traverse rate, as determined by the engagement of the clutch member 62 and in a direction determined by the engagement of the clutch or reverser member 71, thereby raising or lowering the knee member 5. Should the clutch 92 be disengaged, the knee may be manually raised or lowered by applying the hand crank 83, or a similar crank, to the front end of the shaft 91 which is there provided with a clutch element 93 fixed with the shaft and having a clutch face adapted to receive the teeth 84 of the hand crank 83.

It will be seen that the train or transmission from member 71 to and including gear 77 is common to both the knee and saddle, while from the gear 77 power is transmitted through trains individual to the respective supports, that is to say through branch line trains or transmissions.

I will now describe that portion of the transmission which is individual to the table drive, constituting a branch line individual to this support.

On the shank 94 of the previously described bevel gear 69 is fixed a gear 95 (see Figure 11) which meshes with and drives a gear train consisting of idler gears 96 and 97, a gear 98, and a bevel gear 99 fixed with the gear 98 and meshing with oppositely disposed bevel gears 100 and 101, the several gears being provided with suitable bearings for rotation. Passing through suitable bores in the gears 100 and 101 is a table screw 102 rotatably supported by, but fixed against axial movement with, the table 8 and engaging with a nut 103 fixed with the saddle 6. Slidably keyed to the screw 102 and interlying bevel gears 100 and 101, is a sleeve 104 to which in turn is slidably keyed a clutch member 105. The faces of the bevel gears 100 and 101 are provided with clutch teeth and the opposite ends of the clutch member 105 are likewise provided with clutch teeth the various parts providing a reverser whereby the clutch or reverser member 105 may be driven from the one or the other of the bevel gears in opposite directions according to the direction in which it is shifted and will thereupon drive the screw 102 in the one or the other direction. The table will then be caused to travel at a feed or power rapid traverse rate, as determined by the engagement of the clutch member 62. Should the member 105 be disengaged from both of the bevel gears, the table 8 may be manually moved through the medium of a hand crank 106 provided on its hub with clutch teeth 107 adapted to be engaged with mating clutch teeth on the end of a sleeve 108 fixed to the end of the table screw. The crank 106 may likewise be used on opposite end of the table screw, there being on the opposite end a member 109 fixed on the screw 102 and adapted for similar clutch engagement with the crank. It is to be noted that the member 105 operates not only as a motion reverser but also as a motion interrupter individual to the control of table 8.

I will now describe means whereby the various power movements of the several members may be manually controlled.

The gear 64 which is fixed with the clutch member 63 is engaged by a fork 110 Figs. 20 and 21 fixed with a rod 111 slidable in suitable bearings in the case 52. An arm 112 carries a pin or shoe 113 engaging with a slot in the rod 111. The arm 112 is fixed on a rod 114 pivoted in a case or housing 115 fixed with the case 52. A hand-lever 116 is connected with the arm 112 through a pivoted rod 117, a segment 118 fixed with said rod, and a segment 119 fixed with the arm. By this means the movement of the hand-lever 116 may be caused to shift the member 63 in the one direction or the other at the will of the operator, thus producing a feed rate or a power rapid traverse rate of the machine members whose individual control clutches may be engaged.

Figure 8:
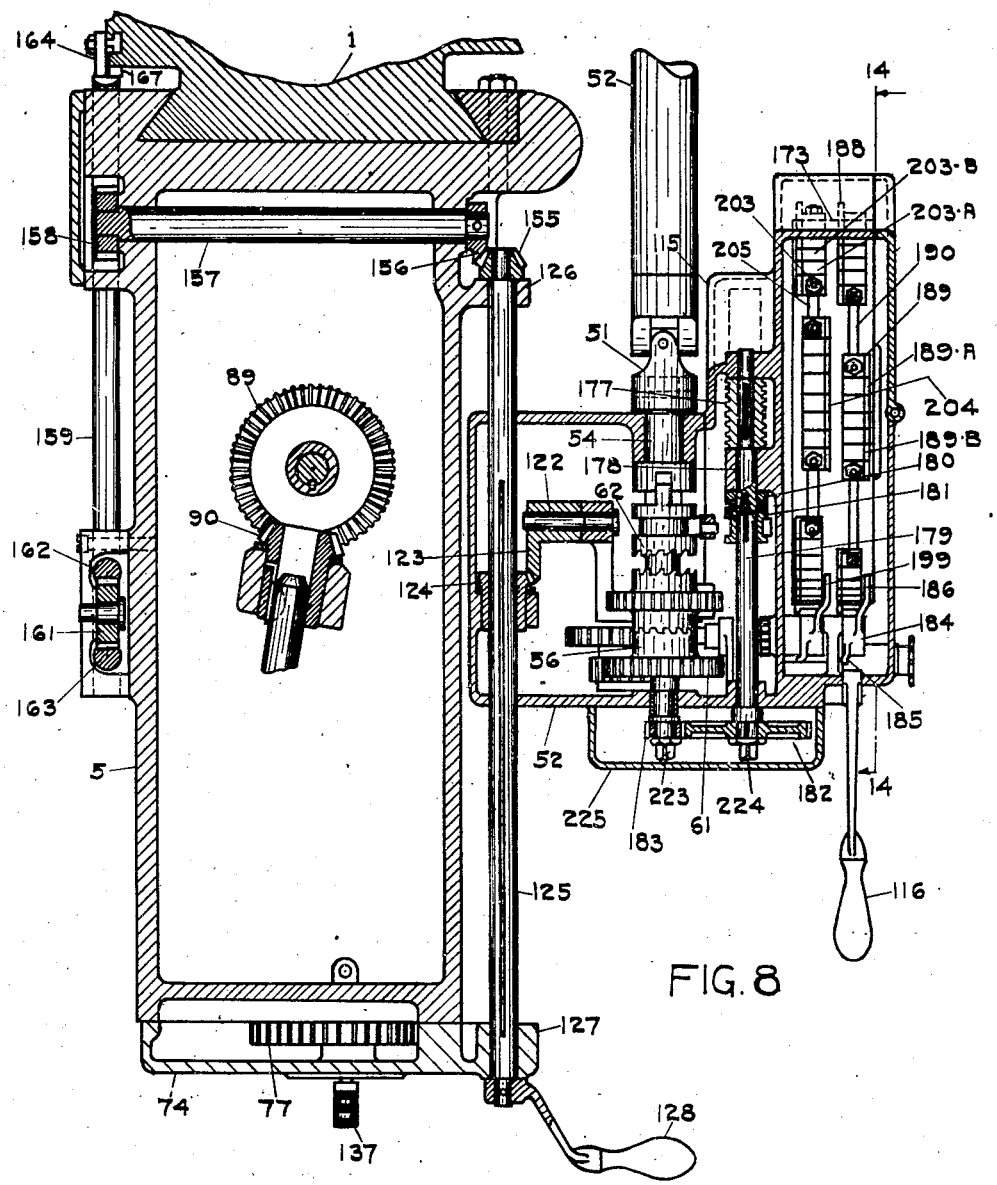
Figure 8 is a horizontal section through the knee and portions of the driving mechanism along line 8—8, Figure 1.

The clutch or reverser element 71, Fig. 18, is provided with a spool or groove engaged by shoes 120 in a forked lever 121 pivoted on a pinion 122 fixed in the case 52. Fixed to the lever 121 is a beveled segment 123 Fig. 8 engaged by a beveled segment 124 slidably keyed to a shaft 125 rotatably fixed at the rear end in a bearing 126 in the knee 5 and at the front end in a bearing 127 in the plate 74. At the front end of the shaft 125 is fixed a hand-lever 128 which by the above-described connected mechanism may, at the will of the operator, shift the clutch member 71 in the one or the other direction, thus causing the gear 75 and likewise the gear 78, to revolve in the one or the other direction. The member 71 may also be positioned in a central or neutral position in which event no power is transmitted. No power will, in any event, be transmitted to the cross or vertical screws unless the clutch members 82 or 92 respectively are engaged; and for determining the engagement of these clutch members, the following mechanism is provided. The clutch members 82 and 92 are provided with grooves or spools 129 and 130 respectively Fig. 9, and a pivoted lever 131 is provided on opposite ends with pins or projections entering into the respective spools, the construction being such that as the lever 131 is swung about its pivot, the one clutch member will enter into engagement with its mating clutch teeth while the other will be withdrawn. The lever 131 is fixed with a pivot pin 132 (see Figures 6 and 9) to the lower end of which is fixed a bevel gear segment 133 meshing with a bevel pinion 134, the stem of which has a bearing in the plate 74 and has fixed at the outer end a lever 135 provided with a plunger 136 which may enter suitable holes located in the plate 74 and is operated by means of a hand-grip 137. The relationship of the various parts is such that when the plunger 136 is withdrawn from the plate, the lever may be swung in either direction, whereupon the one or the other of the clutch members 82 or 92 will be engaged and either the cross or vertical screw but not both will thereupon be driven in the one direction or the other according to the engagement of the member 71.

The table clutch or reverser member 105 is provided with a spool or groove 138 which is engaged by a fork 140 (see Figures 10 and 11) fixed with a rod 141 axially shiftable in suitable bearings in the saddle 6 and provided at the one end with rack teeth 142 engaged by a pivoted gear segment 143. A hand-lever 144 is pivoted in the saddle by the means of a shank 144ª having at its lower end a segment 145 (see Figure 21) which is connected to actuate the segment 143 by the means of a lever 146 having at either end gear teeth engaging the respective segments. By the above-described means the operator may, by suitable movement of the handle 144, engage the member 105 in either direction, thus causing the table to be actuated in the one or the other direction, or may place the member in a central position in which case motion to the table is interrupted.

I will now described the means whereby the member 105 and the member 71 may, when engaged in either direction, be disengaged or tripped out by the movement of the support actuated thereby.

Figures 7, 22:
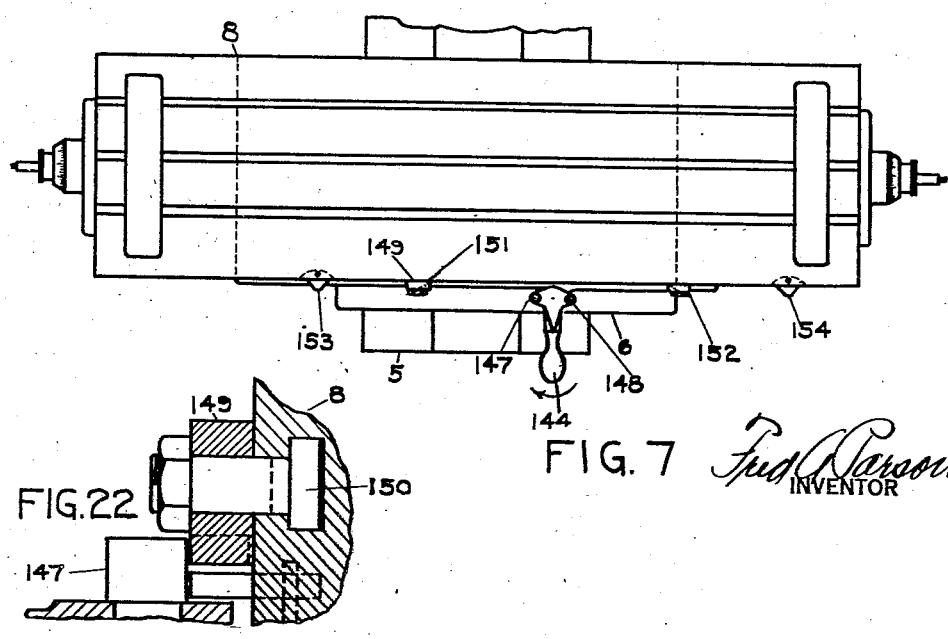
Figure 7 is a plan view of the table or work support, showing portions of the knee and saddle.
Figure 22 is an enlarged portion of certain of the table trip elements.

Fixed with the pivoted lever 144 are two projecting portions 147 and 148 (see Figures 7 and 21). The thread of the table screw 102 and the arrangement of the connecting members between the hand-lever 144 and the member 105 is such that when the hand lever 144 is swung in the direction of the arrow shown in Figure 7, the table will thereupon be caused to travel to the right. Such a swinging movement of the lever causes the pin 147 to approach closer to the front edge of the table. A dog 149 adjustably mounted on the front edge of the table by the means of a T-bolt 150 (see Figures 22 and 7) engaging a T-slot in the table, may be so placed and clamped that at a desired point in the movement of the table, a suitable angular face 151 of the dog will thereupon contact the projection 147 and swing the lever back to a central position, thus disengaging the member 105 and interrupting the power drive, whereupon the table will be brought to rest. A similar adjustable dog 152 is provided for contacting the pin 148 and bringing the table to rest from power movements in the opposite direction.

Fixed with the table 8 are positive stops or fixed dogs 153 and 154 which are adapted to contact the pins 147 and 148 respectively before the table reaches the extreme limits of its movement, thus providing a positive disengagement of the member 105 to prevent breakage. It is to be noted that when the handle 144 is in the central position and the member 105 is disengaged, the dogs 149 and 152 will then pass behind both pins in order that the table may be freely operated by the hand crank 106 without interference with the dogs.

For automatically disengaging or tripping the member 71 by the movement of the saddle 6 or the knee 5, as the case may be, the following provision is made. Fixed with the shaft 125 is a bevel pinion 155 (see Figures 5 and 8) which meshes with a bevel segment 156, fixed with the end of a shaft 157 pivoted in the knee 5 and having fixed at its opposite end a pinion 158. Meshing with opposite sides of the pinion 158 are trip pins 159 and 160. The pin 159 is continued toward the front of the machine and provided with rack teeth meshing with a pinion 161 which meshes with oppositely disposed pins 162 and 163. It will be seen that when the lever 128 is moved to engage the member 71 in one or the other directions, one of the pins 159 or 160 will be moved rearwardly and one of the pins 162 and 163 will be moved upwardly. Should the other necessary clutch members be engaged to cause a movement of the knee 5, the pin which has been moved rearwardly will eventually be contacted by the one or the other of the adjustable dogs 164 or 165 according to the direction of knee movement. The dogs are adjustable in a T-slot 166 in the side of the column 1 whereby contact may be caused to take place at any point in the knee movement, and are provided with angular surfaces which will force the contacted pin back and thereby force member 71 again into a central or neutral position thus interrupting the movement of the knee. Pins 167 and 168 constitute dogs fixed in the column in a position such that they will contact the trip pins 159 and 160 respectively before the vertical limit of the knee movement has been reached, thus rendering certain the tripping of the member 71 before damage can result to the mechanism.

Should suitable clutch members be engaged whereby saddle 6 is caused to travel in the one direction or the other, the one or the other of the pins 162 or 163 which has been moved upwardly by the engagement of member 71 will eventually be contacted by the one or the other of the adjustable dogs 169 or 170, thus forcing the member 71 into a neutral or central position, in a manner similar to that previously described. Positive stops or fixed dogs 171 and 172 are provided on the saddle for limiting the power movement by tripping the member 71 before the saddle 6 comes to the extreme of its movement, the positive stops being arranged to contact the pins 162 or 163.

It will be noted that the various adjustable and positive or fixed dogs previously described together with the members with which they contact for the movement of the various clutch or reverser elements, constitute trips or control means operative directly from the movement of the support or member which is to be controlled, in other words the control movement is in unison with the support movement. It is, of course, unnecessary for this result that the trip parts should be mounted directly on the member to be controlled, this being merely a convenience. They would be equally effective for such a result if suitably disposed on separate members geared to move in unison with the movement of the member or support to be controlled and in certain instances this might even be advantageous since the dog could then travel in any ratio of movement greater or less than the movement of the controlled member, so long as unison of movement were maintained.

In addition to the above-described controls, I have found it desirable to control the power movements of one of the supports, in this instance the table, by the means of a control member which is not movably in unison with the support to be controlled being movable when the support is stationary.

Suitably supported for power movement independent of the table movement which it controls is the control member or element 173, constituting a dog carrier which in this case is in the form of a rotatable drum connected for rotation with a worm wheel 174, pivoted in the case or housing 115, through the medium of a shaft 175 to which the worm wheel 174 is fixed, the shaft having an enlarged head 176 bolted to the hub of the drum 173 (see Figure 13). Meshing with the worm wheel 174 is a worm 177 keyed with a shaft 178 (see Figure 8), provided with suitable bearings in the housing 115. Axially aligned with the shaft 178 is a shaft 179 having a bearing at the one end in the casing or housing and at the other end having a reduced portion having a bearing in a bore in the end of the shaft 178. Fixed with the shaft 178 is a clutch member 180 and slidably keyed to the shaft 179 is a complementary clutch member 181 which may be moved in the one or the other direction to engage or disengage the complementary clutch teeth on the member 180 by means which will be later described. The shaft 179 carries a removable gear 182 which meshes with a removable pinion 183 keyed to the shaft 55. The gears 182 and 183 are removable for the purpose of replacing with other gears of different ratios and are transposable on their shafts, and thus form a rate changer whereby the relative speed or time of rotation of member or drum 173 may be changed.

Being connected to be driven from the shaft 55, the drum 173 is driven at a feed or rapid traverse rate accordingly as the clutch member 63 is engaged in the one or the other direction, and a change in the rate of the support movement will likewise change the rate of movement of drum 173, although a change in the direction of support movement does not affect it nor is it affected when the support is stopped by any of the normal means previously described. The mechanism just described constitutes a power train individual to the control member 173 and including an individual rate changer and an individual motion interrupting clutch.

For the shifting of the clutch member 63 whereby to change from feed to power rapid traverse rate, or oppositely, by the means of the drum movement, certain mechanism is provided as follows:

The pivot 114 of the arm 112 which controls the shifting from feed to power rapid traverse, is provided at its outer end (see Figures 21 and 15, etc.) with a lever or trip element 184 disposed near the periphery of the drum. The lever 184 has arms 185 and 186 in different planes and projecting in different directions from the lever 184. Projecting from the lever 112 is an arrow or detent point 186ª against which a spring pressed plunger 187 acts. The shoe or pin 113 in the lever 112 has lost motion in its slot in the rod 111 so that when moving in either direction under the influence of force applied to the lever 112, the point or the arrow 186ª will pass behind the point of the plunger 187 before the clutch member 63 moves entirely out of engagement with the clutch member from which it may be disengaging. Therefore immediately the clutch member 63 disengages from the one clutch member, it will be forced across under the pressure of the plunger 187 into engagement with the opposite clutch member. When the clutch member 63 is engaged in either direction, the one or the other of the arms 186 or 185 will be swung in towards the surface of the drum and to a position adapted, as the drum moves, to be contacted and forced in the opposite direction by the one or the other of adjustable dogs 188 or 189. The dogs may be clamped in any position around the periphery of the drum by means of bolts engaging in the T-slot 190, and therefore according to the dogs used and their position the clutch member 63 may be shifted in either direction to change from feed to rapid traverse movement or oppositely as often as may be desired and at suitable intervals of time.

For the shifting of clutch member 105 from the movement of the drum 173, additional mechanism is utilized provided as follows:

The segment or lever 146 is provided with a pivot rod 191 Fig. 21 journaled in the saddle 6, to the lower end of which is fixed a beveled segment 192. A pivoted member 193 is provided at the one end with a beveled segment 194 meshing with the segment 192 and at the other end with a segment 195 meshing with a pivoted segment 196. The pivoted hub of the segment 196 is extended and carries at its opposite end a lever 197 provided with arms 198 and 199 disposed close to the periphery of the drum 173. The lever or segment 146 has fixed upon it an arrow 200 against which a spring-pressed plunger 201 operates. The arrow or cam 200 has a central notch portion 202 into which the point of the plunger may enter, the relation of the parts being such that when the plunger is entered in the notch, the clutch member 105 will be retained in a central position by the pressure of the spring. As the member 105 is moved in either direction, the clearance between the complementary clutch teeth is such that the point of the plunger will have passed out of the central notch before the complementary clutch teeth engage, whereupon the spring pressure will cause the member 105 to snap quickly into engagement in whichever direction it may be moving. As the clutch engages in either direction, the previously described connecting parts cause the one or the other of the arms 198 or 199 to move inwardly toward the drum surface and into the path of movement of the one or the other of the dogs 203 or 204 which are adjustable by means of T-bolts engaging the T-slot 205 of the drum 173.

The dogs 203 and 204 may both be made of a variety of heights. A lesser height may be used, in which case the arm which has moved inwardly toward the drum may be moved outwardly by the dog only a sufficient amount to bring the member 105 to a central or neutral position, in which case the notch 202 is engaged by the plunger 201, thus retaining the member in the neutral position and stopping the table movement; or the dog may be of a greater height, in which case the continued movement of the drum will continue to move the arm engaged by the dog, since the drum continues to move although the table is stopped, in which case the member will continue to move in the same direction until the plunger 201 has passed by the one or the other of the points of the arrow 200, when the spring pressure will quickly snap the clutch into engagement opposite to that from which it has just previously been disengaged. In other words, by the means of dogs 203 and 204 suitably dimensioned, the table may be caused to either stop or reverse its direction of movement, and by the proper positioning of the dogs around the periphery of the drum, either of these actions may be caused to take place at any desired interval of time.

It is now apparent that the table may be automatically controlled by the drum to operate in either direction and at either a feed or rapid traverse rate, and starting from a given position may be caused to execute a forward and return movement at either rate or partly at one and partly at the other rate back to the original starting position. Such a movement from and back to a starting point constitutes a cycle of support movement. A variety of gears 182 and 183 of different rates are provided for the rate changer previously described and gears, should, ordinarily, be used of such ratio that when the support has executed its full cycle of movement back to the original starting position, the drum should nearly, but not quite, have completed one complete revolution; one revolution of the drum being considered as one cycle of drum movement. It is contemplated that the table may sometimes make two or more cycles during one drum cycle, suitable gears 182 and 183 being used to increase the time of the drum cycle.

It will be noted that the clutch member 105 may be tripped into a neutral position either from the drum dogs 203 or 204, or from the support dogs 152 or 149. It is ordinarily desirable that when the table is to be tripped out of power engagement and brought to a stop at either end of its reciprocatory movement, this should be done by the means of a dog mounted upon the table as previously described; but when it is to be tripped into power engagement or the direction of motion is to be reversed, this must be done by the means of a dog on the drum. By so doing it will be evident that at least once per cycle of table movement, or as much more often as may be necessary, the dogs on the drum will be brought to a position in the cycle of drum movement exactly corresponding to a given position of table movement. If the table were tripped both in and out of power engagement exclusively by the means of dogs on the drum, it might eventually happen that the drum and the table would get out of step or time, since there is no permanent connection between them.

It is desirable for some modes of operation, the table having completed its cycle of movement as previously mentioned, that the drum, when it shall have later completed its revolution or cycle of movement, should be brought to a stop instead of immediately starting on a second revolution which would eventually start the table on a second cycle of table movement. It is, moreover, desirable in such a case that the rotation of the drum having been stopped, the operator may immediately, or as soon as may be desired, re-engage the drum movement, whereupon the drum will start a second cycle of table movement, and I will now describe the means whereby this is accomplished.

The clutch member 63 has a limited movement in each direction by which it is engaged with the clutch element 62 on the one side or the clutch element 56 on the other side, as has been previously explained, when the respective clutch elements are in their normal position. The clutch elements 62 and 56 are both provided with a backward or outward movement away from the clutch element 63 whereby they may be withdrawn from a position of possible engagement by the clutch member 63 whereupon motion is interrupted both to the clutch member 63 and to the shaft 55 which drives the drum. The gear 61, which is fixed with the clutch element 56, is engaged by a fork 206 fixed on a shifter rod 207. The clutch element 62 is provided with a spool or groove 208 engaged by a pin or shoe 209 in a pivoted lever 210, which at the opposite end is provided with a shoe 211 engaging a slot in the rod 207. It will thus be seen that as the rod 207 is shifted, the clutch element 56 will be caused to move in one direction and the clutch element 62 in the opposite direction. A hand-lever 212 is pivoted in the casing 52 and is connected to move the rod 207 by the means of a lever 213 provided with a shoe 214 engaging a slot in the fork 206. A rod 215 on which the lever 210 pivots, is provided at its opposite end 215$^a$ with a lever 216 at the outer end of which, and in close proximity to the periphery of the drum, is a pivoted latch 217 which is normally forced against a stop point 218 by the means of a spring-pressed plunger 219. The lever 210 carries an arm 221, the outer end of which has an arrow shape and is contacted by a spring-pressed plunger 222. The form and relationship of the parts is such that the pressure of the plunger 222 will strongly tend to hold the clutch elements 56 and 62 in one or the other of their two positions, the one position where they may be engaged by the clutch member 63 or in the other position where the clutch member 63 may not engage them. When the elements 62 and 56 have been moved by means of the hand-lever 212, or otherwise, to a position where they may be engaged by the clutch member 63, the lever 216 will then be swung in such a manner that the latch 217 stands close to the periphery of the drum.

Fixed to the periphery of the drum is a removable dog element 220 in a plane such that as the drum rotates, if the arm 216 has been swung as just described, the dog will eventually contact the latch 217, in which case, owing to the pressure of the spring plunger 222 on the arrow point of the arm 221, the arm 216 will not be moved until the latch 217 has been moved a certain distance against the pressure of the spring plunger 219, after which the arm 216 will be moved, causing a movement of the rod 207 and an outward or disengaging movement of the clutch elements 62 and 56. At a certain point of this movement, the plunger 222 will pass over the point of the arrow and the movement will continue under the influence of the spring-pressed plunger 222, the complete movement swinging the arm 216 back to a position corresponding to a disengaged position of the clutch elements 62 and 56. At some point of this movement, the latch 217, being freed from the dog 220, may return to its position against the stop 218. This movement of the latch is sufficient and the forms of the latch and the dog are such that the return movement just described, brings the latch back to a point where the latch clears the dog and the clutch members may be immediately or at any later time returned to a position to be engaged by member 63 by the means of the hand-lever 212, or otherwise, without interference with the dog 220.

When the clutch elements 56 and 62 are in disengaged position, all power movement to the drum or to the machine supports is disconnected or interrupted, altho the drum and the table may still be connected together in such a manner that if manual movement is applied to the connecting train, the drum and table may be caused to go through their cycle of movement. This is very useful in arranging and locating the dogs, or in other words, in setting up the machine for automatic cycles; and for the purpose of applying manual movement to the drum and table, I have provided squared ends 223 and 224 to the shafts 55 and 179 respectively, and by removing a cover 225, suitable cranks may be applied to the squared ends of the shafts whereby the table and the drum may be manually caused to slowly execute their cycles during the preliminary setting-up process.

Since the machine is provided with a control means independently of the drum and it is purposed to operate the machine at times without the use of the somewhat more complicated control feature provided by the drum; means are provided whereby the drum may be disconnected from its driving train and remain stationary as long as may be desired, or may be again re-engaged for power movement. The shaft 179 drives the worm shaft 178 through the medium of the sliding clutch member 181 and the clutch member 180 fixed with the shaft 178 as previously noted. A pivoted hand-lever 226 is connected to move the clutch member 181 to disconnect the shaft 179 from the shaft 178 by the means of an eccentric head 227 on the pivot pin 228 which carries the hand-lever 226. A pivoted lever 230 has an arm 231, the end of which is reduced to enter a slot or groove 232 in the clutch member 181. A rod or bar 233 having a connection with the lever 230 on the one end and with a pin 234 on the eccentric head 227, completes the connection between the hand-lever 226 and the clutch member 181, whereby the hand-lever may be caused to move the clutch element and disconnect the power connection to the drum while maintaining the power connection to the various supports.

The hand controls to the clutch member 63 and to the table clutch member 105, and particularly to the latter, might be operated through error on the part of the operator, and under certain conditions of drum control such operation might cause interference with the timing arrangement between the drum and the table. To prevent this, I have shown extra filler dogs 203ª, 203ᵇ, etc., and 189ª, 189ᵇ, etc., fixed to the periphery of the drum. A sufficient number of these extra dogs suitably placed, are used to provide interference pieces or an interlock at all of the positions of the drum intermediate the desired positions of clutch actuation whereby when the drum is being used, it will be impossible because of interference between the filler dogs and the trip elements or arms 185, 186, 198, or 199, for the operator to shift the hand-lever 144 and thereby shift the clutch member 105 either to stop or reverse the table or to shift the hand-lever 116 and thereby shift the clutch 63 except when the drum is in the predetermined positions where such movements should take place. Although the shifting of the clutch member 63, which merely changes the rate of the table travel, could not affect the relative timing of the drum and table, it might still be objectionable in the operation of the machine.

For the purpose of providing access to the periphery of the drum when setting up the drum dogs, I have provided a hinged cover portion 235 for the case or housing 115 in which the drum is contained, and, for the purpose of removal of the dog 220, in case it is desired that the drum should execute a continuous cycle, I have provided an opening 236 in the case or housing 115.

Having now fully disclosed my invention, I claim:

1. In a milling machine embodying a movable support, the combination of a power source, a transmission train connecting said source to said support, said train embodying a shiftable clutch element, a dog having continuous uni-directional power movement when said support is stationary, and an operating connection from said dog for shifting said element.

2. In a milling machine, the combination of a movable support, a power source, transmission mechanism for actuating said support from said source at a constant rate or at a predetermined variable rate, a clutch element in said transmission mechanism shiftable for alternating said rates, and a dog operatively connected to shift said element and having continuous uni-directional power movement when said support is stationary.

3. In a milling machine, the combination of a reciprocable support, a power source, a transmission train available for actuating said support from said source, said train embodying a motion reverser including a shiftable element, a dog having continuous uni-directional power movement when said support is stationary, and an operating connection from said dog to shift said element.

4. In a milling machine embodying a reciprocable support, the combination of a power source, transmission means including trains for actuating said support from said source at a constant rate and at a predetermined variable rate, said means embodying a clutch element shiftable for alternating the connection to the one or the other of said trains and likewise embodying a motion reverser including an element shiftable for reversing the direction of support actuation, a plurality of dogs having continuous unidirectional power movement when said support is stationary, and motion transmitting connections from the respective dogs to shift the respective elements.

5. In a milling machine organization having a movable support, the combination of a power source, a shiftable clutch element, a first transmission connecting said power source, said element, and said support in series in the order stated, a dog operatively connectible to shift said element, and a second transmission connected to said first transmission between said source and said element and connected to impart continuous unidirectional power movement to said dog.

6. The combination with a milling machine having a movable support, of a transmission train connecting in serial driving relationship a power source, a shiftable motion interrupting clutch element and said support, a control member operatively connected with said element, and a transmission train including rate change elements connected to said member and connected to the first named transmission train at a point between said source and said element.

7. In a milling machine, the combination of a movable work support, a first power driven transmission train including a rate changer and terminating in a first clutch member, a second power driven transmission train terminating in a second clutch member, a motion reverser including a shiftable element, a third transmission train including shiftable clutch means for selective connection to said first or to said second member, said third train being adapted to connect the selected member, said reverser element and said support in the order named, a control device including a portion movable when said support is stationary and connected for selectively shifting said means or said element, and a fourth transmission train connected to said third train between said clutch means and said reverser element and connected to drive said portion.

8. In a milling machine having a movable work support, the combination of first and second power driven transmissions, one of which embodies a rate changer, a third power train including a motion reverser having a shiftable element and having shiftable clutch means for selective connection to driven elements of said first or second train, said third train being connected with said support, a control device having motion transmitting connection with said motion reverser element and with said shiftable clutch means, and an auxiliary transmission train including rate change elements and connected for actuating portions of said control device and connected with said third train at a point where said motion reverser is ineffective.

9. In a milling machine, the combination of a movable support, a power source, a shiftable clutch element, a first transmission train connecting said source, said element, and said support, control means for shifting said element embodying a first dog movable in unison with said support, and a second dog movable when said support is stationary, said dogs each having motion transmitting connection with said element, and a second power driven transmission train connected to move said second dog.

10. The combination with a milling machine having a movable support and having a power driven transmission train connected for the actuation of said support, said train including a shiftable motion interrupting clutch element, of a first clutch control member movable in unison with said support, a second clutch control member having movement when said support is stationary, each of said members having motion transmitting connections with said clutch element, rate change means, and another power train connected to derive motion from said first train independently of the position of said clutch element and connected to actuate said second clutch control member through said rate change means.

11. In a milling machine, the combination of a movable support, a power transmission train connectible therewith and including a rate changer and a shiftable clutch element, means for shifting said element including a first dog movable with said support and a second dog movable when said support is stationary, another power train connectible to move the last-named dog and connected to derive power from the first-named train through said rate changer but not through said clutch element, and motion transmitting connections connecting each of said dogs with said clutch element.

12. In a milling machine, the combination of a movable support, a first power driven transmission train including a rate changer and terminating in a first clutch member, a second power driven transmission train terminating in a second clutch member, a shiftable motion reverser element, a third transmission train including shiftable clutch means for selective connection to said first or to said second member, said third train being adapted to connect the selected member, said reverser element and said support in the order named, control means including a first part connected with said support for movement in unison therewith and connected for shifting said reverser element, and a second part movable when said support is stationary and connectible for selectively shifting said clutch means or said reverser element, and a fourth power driven transmission train connected to said third train between said clutch element and said reverser element and connected to drive said second part.

13. In a milling machine, the combination of a movable support, a first and second power transmission train respectively terminating in a first and second clutch member, a third transmission train including a shiftable motion reverser element and including selectively shiftable clutch means for connecting the second train for actuation from said first or second member, a dog movable with said support and having motion transmitting connection with said reverser element, other dogs movable when said support is stationary and respectively having motion transmitting connection with said reverser element and with said clutch means, a rate changer, and a fourth transmission train connected to actuate said other dogs through said rate changer and connected to said third train at a point to derive motion unaffected by said reverser element.

14. In a milling machine, the combination of a reciprocable table, a table screw, a power source, a first and a second transmission train connected to said source and respectively terminating in a first and second clutch member, a motion reverser including a shiftable reverser element, a third transmission train including shiftable clutch means selectively engageable with said first or second member, said third train being adapted to connect said clutch means, said reverser element, said screw, and said table, in the order named, a control device including a control member movable when said table is stationary, motion transmitting connections from said control member to said means and to said element, and a fourth transmission train connected to said third train between said clutch means and said reverser element and connected to drive said control member.

15. In a milling machine, the combination of a movable support, a power driven transmission connected for the movement of said support and including a clutch element shiftable for determining the effect of said transmission, control devices having motion transmitting connection with said element, including a manually operable hand-lever, a part movable in unison with said support and another part movable when said support is stationary, and a power train connected to the last-named part.

16. In a milling machine having a movable support, the combination of a transmission train connected with a power source and with said support and including a shiftable clutch member, a variety of control devices each having motion transmitting connection with said clutch member and including a manually operable hand lever, a dog movable with said support and another dog movable when said support is stationary, a rate change device, and a power train connectible to actuate the last-named dog from the first-named train through said rate change device.

17. In a milling machine, the combination of a movable support, a power train including a rate changer and a shiftable clutch member and connectible to actuate said support, control devices each having motion transmitting connections with said clutch and including a hand-lever, a first dog actuated from said power train in unison with said table, and a second dog having an individual power train connectible therewith and connected with the first named train to derive motion through said rate changer but unaffected by the shifting of said clutch member.

18. In a milling machine, the combination of a reciprocable support, transmission mechanism including a plurality of power trains for actuating said support in either direction and at a plurality of rates, shiftable clutch elements in the said trains for controlling both the direction and the rate of support actuation, control means including a portion movable in unison with said support and another portion movable when said support is stationary, a power train connected to drive the last-named portion, and motion transmitting connections from each of said portions to one of said elements.

19. In a milling machine, the combination with a reciprocable support and clutch controlled driving connections therefor operable to cause said support to be actuated in either direction and at a plurality of rates, of a clutch operating member, power connections therefor including rate change elements individual thereto and operative connections both from said support and from said member to one of the clutches in the support driving connections.

20. In a milling machine the combination with a movable support and driving connections therefor including a shiftable clutch member, of a dog having operative connection with said clutch member and driving connections individual to said dog including a motion interrupting clutch means.

21. In a milling machine, the combination of a movable support, a power driven transmission available for the movement of said support including a clutch element shiftable for determining the effect of said transmission, a control device for shifting said element including a control member movable when said support is stationary, and a power train individual to said member and including rate change elements and a clutch for connecting and disconnecting said train.

22. In a milling machine, the combination of a movable support, a power driven transmission available for the movement of said support and including a clutch element shiftable for determining the effect of said transmission, control means including a member movable in unison with said support and another member movable when said support is stationary, each of said members having motion-transmitting connection with said element, a power train connectible to the last-named member, and a clutch for connecting and disconnecting said train.

23. In a milling machine, the combination of a movable support, a clutch controlled driving connection for the actuation thereof, control means for a clutch of said driving connection including a control member having an individual drive train, a clutch member in said drive train and a dog on said control member connectible in the movement of said control member for shifting said clutch member.

24. In a milling machine, the combination of a reciprocatory table, transmission mechanism including power trains for actuating said table in either direction and at a plurality of rates, shiftable clutch elements in the said trains for controlling both the direction and rate of table actuation, a control device including portions reciprocable in unison with said table and other portions movable in one direction about an axis of revolution, a power train connected to the last-named portions, and motion transmitting connections from each of said portions to one of said elements.

25. In a milling machine, the combination with a movable support and clutch controlled driving connections therefor, of a control member, a power train for the individual actuation thereof including rate change elements, and motion transmitting connections between said member and a clutch in the support driving connection.

26. In a milling machine, the combination with a movable support and driving connections therefor including a control clutch whereby said support may be selectively actuated at a constant rapid traverse rate or at a predetermined variable feed rate, of a control member connected for the shifting of said clutch, and a power train connected with said member and including elements for changing the rate of member actuation without changing the rate of actuation of said support.

27. In a milling machine, the combination with a reciprocable support and driving connections therefor including a motion reverser, of a control member connected to operate said reverser, and an individual power train including rate change elements and operatively connected with said member.

28. In a milling machine, the combination with a reciprocable support and driving connections therefor including clutch controlled trains for actuating said support selectively at a constant rate or at a predetermined variable rate and in the one or the other direction, of a control member, motion transmitting connections therefrom to a clutch in said driving connections which controls the selection of said rates, and to a clutch in said driving connections which controls the direction of support actuation, and a power train connectible with said member and including rate change elements for altering the rate of member actuation.

29. In a milling machine, the combination of a reciprocable support, transmission mechanism including a plurality of power trains for actuating said support in either direction and at a plurality of rates including a shiftable clutch element for changing the direction and a second shiftable clutch element for changing the rate of support actuation, a manually operable hand-lever, a trip actuating member movable in unison with said support and a power operated trip actuating member movable when said support is stationary, a pair of trip devices adapted to be contacted and moved by the movement of the respective members, and motion transmitting connections from said lever and from both of said trip devices for the shifting of one of said elements.

30. In a milling machine having a reciprocable support, the combination of control means including a control member movable when said support is stationary, transmission mechanism including clutch means respectively shiftable for changing the rate of the support and member and for changing the direction of support actuation, and for interrupting the movement of the support and member, and motion transmitting connections from said member to each of said clutch means.

31. In a milling machine, the combination of a movable work table, a screw for the movement of said table, a power source, a transmission train connecting said source to said table through said screw, said train embodying a shiftable clutch member, a dog having trip connection with said clutch member and movable when said screw is stationary, and a power train connected for the positive movement of said dog.

32. In a transmission and control mechanism for milling machines, the combination with transmission trains available for selectively transmitting motion in either direction and at a constant or at a predetermined variable rate and a plurality of shiftable clutches respectively controlling the direction and the rate of motion of said trains, of a dog having potential trip connections with some of said clutches and connected to be positively driven from one of said trains at a point unaffected by said direction controlling clutch.

33. In a milling machine, the combination of a reciprocable support, control means including a control member movable when said support is stationary, transmission mechanism comprising power trains and including clutch means respectively shiftable for interrupting support movement, for changing the rate of support and member movement, and for interrupting support and member movement, and motion transmitting connections from said member to shift each of said clutch means.

34. In a milling machine, the combination of a reciprocable table, a table screw, a rotatable control drum, transmission trains for actuating said screw and said drum, a shiftable clutch in the screw train, a plurality of adjustable control dogs one of which is reciprocable in unison with said table and one of which is rotatable in unison with said drum, a plurality of trip instrumentalities movable into the path of movement of the respective dogs, and motion transmitting connections from each of said instrumentalities to said clutch.

35. In a milling machine, the combination of a reciprocable table, a rotatable control drum, transmission means for actuating said table in either direction and at either a feed rate or a rapid traverse rate and for rotating said drum, and including a plurality of shiftable clutch elements for stopping the table movement and for controlling both the rate and direction of table actuation, a plurality of adjustable control dogs, one of which is movable in unison with said table and one of which is movable in unison with said drum, and a plurality of trip instrumentalities adapted to be contacted by the movement of the respective dogs and having motion transmitting connections with one of said clutch elements.

36. In a milling machine having a reciprocable support, and transmission mechanism therefor including power trains having shiftable clutches for controlling both the rate and direction of support actuation, and for stopping and starting the movement of said support; the combination of trip elements connected to move the respective clutches, a control member movable when said support is stationary, a trip dog adjustably mounted on said member and adapted to contact one of said elements during the movement of the member and a power train connected for positive actuation of said member.

37. In a milling machine having a reciprocable work table, the combination of a power source, a shiftable reverser, a first transmission train connecting said source, said reverser, and said table in series in the order stated, a control device including a dog having operative connection with said reverser, and a second transmission train connected to said first train between said source and said reverser and connected to impart positive power movement to said dog.

38. In a milling machine, the combination of a reciprocable work table, a power source, a transmission train connecting said source to said table and embodying a shiftable reverser element, control means for shifting said element having a first member movable in unison with said table, and a second member movable when said table is stationary, said members each having motion transmitting connection with said element, and a second power driven transmission train connected to move said second member.

39. In a milling machine, the combination of a reciprocable work table, a power source, a transmission train connecting said source to said table and embodying a shiftable motion reverser element, control devices including a first member movable in unison with said table, a second power actuated member movable when said table is stationary, and a movable hand-lever, and motion transmitting connections to said element from each of said members and from said lever.

40. In a milling machine, the combination of a movable work support, transmission means for the movement of said support selectively at a predetermined variable feed rate or at a constant power rapid traverse rate and including a clutch shiftable to apply the one or the other of said rates, control devices including a movable hand-lever and a dog having positive power movement when said support is stationary, and motion transmitting connections both from said hand-lever and from said dog, to said clutch.

41. In a milling machine, the combination with a reciprocable work support and driving connections therefor whereby said support may be actuated in either direction and at a plurality of rates, said driving connections including a motion reverser and a rate change clutch; of a control member, a power train connectible therewith and including rate change elements, motion interrupting means effective both on said support driving connections and on said train, and a plurality of motion transmitting trip connections respectively available for connecting said member with said clutch, said reverser and said interrupting means.

42. In a milling machine, the combination with a reciprocable work support and a power operable transmission train connectible therewith and including a motion reverser, of a control member, an individual power train connected therewith including rate change elements and connected with the first-named train at a point unaffected by said reverser and motion transmitting trip connections connecting said reverser with said member.

43. A milling machine as specified in claim 37 in combination with a feed change mechanism in said first train between said source and the connection for said second train, and rate change means in said second train.

44. In a milling machine, the combination of a movable support, a first power actuated transmission train including a feed change mechanism and terminating in a first clutch member, a second power actuated constant speed transmission train terminating in a second clutch member, a third transmission train connected to actuate said support and having a clutch selectively shiftable to receive power either from said first or second member, a control device having a portion movable when said support is stationary and connected with said clutch, and a fourth transmission train connected to said third train between said clutch and said support and connected to actuate said portion of said device.

45. A milling machine as specified in claim 44 in combination with rate change means in said fourth train.

46. In a milling machine, the combination with a reciprocable table having driving connections embodying a pair of power trains each terminating in a clutch member and a third power train connected to said cable through a shiftable selector clutch element adapted to engage the one or the other of said members, a shiftable reverser element and a table screw, of a control member having motion transmitting trip connections with each of said elements, and a power train including rate change elements connected to actuate said member and connected to said third train to be driven thereby from a point unaffected by said reverser.

47. In a milling machine, the combination with a reciprocable work support having clutch controlled driving connections including a motion reverser and a selector clutch shiftable for selectively actuating said support at a constant rate or at a variable rate, of a control member having trip connections with said reverser and with said clutch, and a driving train connected with said member and connected to be irreversibly driven from the support driving connections, said driving train including rate change elements whereby the rate of actuation of said member may be changed without changing the rate of said support.

48. In a milling machine, the combination of a reciprocable work table, a control device having a control member movable when said table is stationary, a power source, a first transmission train connected to said source and including rate change means and terminating in a first clutch member, a second transmission connected to said source and terminating in a second clutch member, a motion reverser including a shiftable reverser element, a third transmission train including shiftable clutch means selectively engageable with said first or second member, said third train being adapted to connect said clutch means, said reverser element and said table in the order stated, a fourth transmission train connected to said third train between said clutch means and said reverser and connected to drive said control member, a motion interrupter effective on said third and fourth trains, a variety of trip elements connected for movement respectively with said shiftable clutch means, said motion reverser element and said motion interrupter, and a variety of adjustable control dogs connected with said control member and respectively adapted to contact the respective trip elements.

49. In a milling machine, the combination with a reciprocable table and clutch controlled driving connections therefor including a motion reverser and a selector clutch shiftable for selectively actuating said support at a constant rate or at a predetermined variable rate, of a control member, a driving connection therefor including rate change elements and connected with said table driving connections at a point unaffected by said reverser but affected by said selector clutch; said driving connection including a motion interrupting means effective both on said table and on said member, and trip connections from said member to said reverser, said clutch, and said motion interrupting means.

50. In a milling machine, the combination of a movable table, a rotatable control drum movable when said table is stationary, transmission mechanism for actuating said table and said drum including a shiftable clutch for connecting or disconnecting said table, a first control dog connected with and movable in unison with said table, a second control dog connected with and movable in unison with said drum, a first and second trip element respectively movable into the path of movement of the first or second dog, and motion transmitting connections between both of said trip elements and said clutch.

51. In a milling machine, the combination of a movable support, a rotatable control drum movable when said support is stationary, transmission mechanism for actuating said support in reciprocatory cycles and said drum in continuous rotational movement and including shiftable clutch means for interrupting the support movement, a control dog movable in unison with said drum, a trip element movable into the path of movement of said dog, and motion transmitting connections between said trip element and said clutch means.

52. In a milling machine embodying a reciprocable table and a rotatable control drum, the combination of transmission mechanism for actuating said table and said drum including a shiftable clutch for interrupting and re-establishing the movement of said table, a first trip device adjacent a longitudinal table edge and connected to actuate said clutch, a first trip dog on said table and arranged to contact and move said device to disconnect said clutch at a predetermined point when said table is moved, a second trip device adjacent the periphery of said drum and connected to actuate said clutch, and a second trip dog on said drum and arranged to contact and move said second trip device in a direction to re-engage said clutch.

53. In a transmission and control mechanism for milling machines, the combination of a shiftable transmission clutch element, two movable machine members one of which is movable when the other is at rest, a control dog on each of said members, trip parts respectively having a portion movable into the path of movement of the respective dogs, and motion transmitting connections from each of said trip parts to said element.

54. In a milling machine organization, the combination of a transmission mechanism including a shiftable motion reverser element and a shiftable rate change element, a pair of movable machine members one of which is movable when the other is at rest, control dogs on the respective members, trip parts respectively having a portion movable into the path of movement of the respective dogs, and motion transmitting connections from each of said parts to one of said elements, and from one of said parts to the other of said elements.

55. In a milling machine organization, the combination of a tool support and a work support, one of said supports being stationary and the other being movable, a third support bodily movable between the other supports, a drive member supported from the stationary support, transmission mechanism connecting said member and the movable support and including a shiftable transmission control clutch and a transmission element journaled in said third support, and clutch shifting means including a drum having power connection with said drive member and rotatably supported from said third support.

56. In a milling machine, the combination of a tool support and a work support, a power source, transmission mechanism connecting said source with one of said supports and including a shiftable clutch member, a rotatable drum, transmission mechanism nonreversibly connecting said drum with said power source, a trip member adjacent said drum, motion transmitting connections from said trip member to said clutch member, a trip dog on said drum adapted to contact said trip member at each revolution of said drum, a shiftable motion interrupting clutch member in the last-named transmission mechanism, a trip device having motion transmitting connection with the last-named clutch member, and a dog on said drum adapted to contact the last-named device at each revolution of said drum, whereby said drum will be disconnected from said source.

57. A milling machine as specified in claim 56 in combination with a manually operable lever having motion transmitting connection to the clutch member last-named in said claim, whereby said clutch, having been automatically moved by the specified drum dog to disconnect said drum from said source, may be manually returned.

58. In a milling machine, the combination of a tool support and a work support, one of which is stationary and the other relatively movable, a drive pulley rotatably supported from the stationary support, a third support bodily movable between the other of said supports, power transmission mechanism connecting said pulley with one of the movable supports and including a shaft journaled in said third support and transmission elements from said pulley to said shaft adapted to maintain a driving connection despite the bodily movement of said third support, shiftable motion controlling clutches in said transmission, a control device for some of said clutches including a drum rotatably supported from said third support, and a power train connected with said drum and connected to derive power from said shaft.

59. In a milling machine, the combination of a tool support and a work support, a first and second frame member slidably intervening between said supports and providing for relative support movement in three transverse paths, a first, second, and third screw for actuating the respective frame members and one of said supports, a power source, power trains connecting said source with said screws and including a plurality of shiftable clutch elements for connection and disconnection of the respective screws to control the power actuation thereof, a plurality of trip elements adjacent the respective frame members and said work support and respectively having motion transmitting connection with the clutch elements controlling the power actuation of the respective screws, a plurality of dogs adjustably fixed to contact the respective trip elements as the supports are relatively moved in the one or the other of said paths whereby the respective clutch elements will be shifted to disconnect the respective screws, a control member movable independently of said screws and connected with said source, a trip device adjacent the last-named member and having motion transmitting connection with one of said clutch elements and an adjustable dog on the last-named member and adapted to contact said trip device in a direction to re-engage the clutch element with which said device is connected.

60. In a milling machine transmission and control mechanism, the combination of a tool support and a relatively movable work support, a power source, a transmission train connecting said source with one of said supports and including a shiftable clutch for controlling support actuation, a control system including a hand-lever having motion transmitting connection with said clutch, an auxiliary control system including a trip device having motion transmitting connection with said clutch and a dog movable when said supports are relatively stationary and adapted to contact said trip device, and interlocking means alternatively available for permitting or for preventing the movement of said clutch from said hand-lever.

61. In a milling machine organization, the combination of an upstanding column providing a source of power, a variety of work supporting members slidably supported from said column including a table, a saddle providing ways for table movement and a knee relatively slidable with said column and with said saddle, whereby said table may be reciprocated in three transverse directions, transmission mechanism connecting one of said members with said source and including shiftable clutch elements, and a control device for shifting some of said clutch elements including a drum rotatably mounted on said saddle.

62. In a milling machine having a movable support, the combination of a transmission and control mechanism for said support including a shiftable clutch in said transmission system and a rotatable drum in said control system having motion transmitting connection with said clutch, an individual transmission for said drum including a clutch shiftable for interrupting drum motion, a dog removably mounted on said drum, and a trip device adjacent said drum and having a motion transmitting connection with the last-named clutch whereby when said dog is in place, the last-named clutch will be shifted at the completion of one drum revolution, or when said dog is removed the last-named clutch will not be shifted and the drum will revolve continuously.

63. In a milling machine, the combination of a rotatable tool spindle, a reciprocable work table, a power source, a first clutch, a first transmission train connecting said source and said spindle through said clutch, a feed rate changer, a first clutch element, a second transmission train including said feed rate changer and connecting with said first transmission between said clutch and said spindle and connected to drive said first clutch element, a second clutch element, a third transmission train connecting said second clutch element and said source, clutch means alternatively shiftable to connect with said first or said second clutch element, a reverser, a fourth transmission train connecting said clutch means, said reverser, and said table in the order named, a rotatable control drum, and a fifth transmission train connected to said fourth train between said clutch means and said reverser, and connected to actuate said drum.

64. In a milling machine, the combination of a movable support and an irreversibly rotatable control drum, a power source, and transmission mechanism for connecting said source both with said support and with said drum including clutch means for disconnecting said source.

65. In a milling machine the combination of a movable support and a rotatable control drum, a power source, and transmission mechanism for connecting said source both with said support and said drum including a portion individual to said drum and having a clutch for disconnecting said portion from said source.

66. In a milling machine, the combination of a tool support and a work support, one of which is stationary and the other relatively movable, a drive pulley rotatably supported from the stationary support, a third support bodily movable between said other supports, a pair of rotatable clutch elements journaled in said third support, a transmission train connecting said pulley and one of said elements and including a feed rate change device, a constant speed transmission train connecting said pulley and the other of said elements each of said trains including elements adapted to maintain their driving connection despite the movement of the movable supports, a power train including a clutch member shiftable for alternatively connecting the one or the other of said elements with the movable support, a control device for shifting said clutch including a drum rotatably supported from said third support, and a transmission train connecting said clutch member with said drum.

67. In a milling machine, the combination of a movable support, control mechanism therefor including a rotatable drum, a power train connecting in the order named said drum, a rate change means, a motion interrupting clutch, and said support, a power source, and a transmission train connecting with said source and connected with said power train between said clutch and said rate change means.

68. In a milling machine transmission and control mechanism, the combination of a reciprocatory support, a rotatable control drum, a transmission train connecting said support and said drum, a power transmission train connected to the first-named train between said support and said drum, and a clutch for disconnecting said trains to permit manual actuation of the first-named train.

69. In a transmission and control mechanism for milling machines, the combination of a movable support, a dog movable when said support is at rest, a common transmission train for said support and dog including a shiftable clutch element for interrupting said train trip means adjacent said dog and movable into the path of dog movement, and motion transmitting connections from said trip means to said clutch element.

70. In a transmission and control mechanism for milling machines, the combinaiton of a shiftable transmission clutch element, two movable machine members, one of which is rotatably movable when the other is at rest, transmission mechanism operatively connected for the actuation of one of said members and subject to the control of said clutch element, a control dog on each of said members, trip parts respectively movable into the path of movement of the respective dogs, and motion transmitting connections from each of said trip parts to said element.

71. In a milling machine embodying a reciprocable table and a rotatable control drum, the combination of transmission mechanism for actuating said table and said drum including a first shiftable clutch element for interrupting and re-establishing the movement of said table and a second shiftable clutch element for simultaneously interrupting the movement of said table and drum, trip devices operatively connected with said first clutch element, including a first trip member adjacent a longitudinal table edge and a second trip member adjacent said drum, a third trip member adjacent said drum and operatively connected with said second clutch element, a first trip dog on said drum and arranged to contact and move said first trip member in a direction to engage said first clutch element, a second trip dog on said table arranged to contact and move said second trip member in a direction to disengage said first clutch element, and a third trip dog on said drum arranged to contact and move said third trip member.

72. In a milling machine, the combination with a movable support, transmission mechanism therefor including a control clutch element and a plurality of trip devices connected for the movement thereof, of a power actuated rotatable control drum and a variety of control dogs including a first dog on said drum, a second dog on said support and a third dog on said drum, said drum and said support each having cyclic movement and said dogs being spaced to contact one or another of said trip devices in the order named.

73. In a milling machine, the combination with a movable support, and driving connections therefor including a clutch governing the effect of said connections on said support, of an independently power operable control device including dogs mounted for positive cyclic movement and motion transmitting connections operable between said dogs and said clutch for the actuation of said clutch in a predetermined series of movements during a given cycle of movement of said dogs.

74. In a milling machine, the combination of a table, a supporting structure embodying a column, knee and saddle providing for table reciprocation in a plurality of transverse paths, transmission mechanism having trains connected for table actuation in each path and each including a controlling clutch, a first control device co-operative with one of said clutches to control table movement in one of said paths in accordance with said movement, a second control device including a power operated control member mounted for cyclic movement, and motion transmitting connection between said control member and the clutch controlled by said first device, whereby said clutch may be controlled in part in accordance with the movement of said table and in part in accordance with the movement of said control member.

75. In a milling machine, the combination with a work table movable in cycles, and clutch controlled transmission connections therefor including a plurality of clutch members having different control functions, of a control device including a control member having cyclic movement independent of the table movement, a plurality of dogs mounted on said control member for movement in different paths, and trip elements movable into the respective paths and having connections for the movement of the respective clutch members, whereby the respective dogs may control the respective functions.

76. In a milling machine, the combination with a movable support and clutch controlled transmission mechanism therefor, including a shiftable clutch element, of a control mechanism including a central member having cyclic movement independent of said support, and motion transmitting connections from said clutch element adapted for co-action with said control member to move said clutch element at intervals determined by the cycle of control member movement.

77. In a transmission and control system for milling machines, the combination of two movable members, each mounted for cyclic movement, clutch controlled transmission machanism therefor including a shiftable clutch element, a plurality of motion transmitting connections from said element respectively terminating in trip elements adjacent the respective members, and control dogs adjustably mounted on the respective members and adapted to impact the respective trip elements and thereby alternatively move said clutch element at intervals predetermined by the cycles of said members.

FRED A. PARSONS.